(12) United States Patent
Hsu

(10) Patent No.: US 10,115,184 B2
(45) Date of Patent: Oct. 30, 2018

(54) DISPLAY DEVICE, METHOD AND DEVICE FOR PROCESSING IMAGE DATA

(71) Applicant: EVERDISPLAY OPTRONICS (SHANGHAI) LIMITED, Shanghai (CN)

(72) Inventor: Jung-Chung Hsu, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 246 days.

(21) Appl. No.: 15/158,812

(22) Filed: May 19, 2016

(65) Prior Publication Data

US 2017/0053582 A1 Feb. 23, 2017

(30) Foreign Application Priority Data

Aug. 18, 2015 (CN) .......................... 2015 1 0506973

(51) Int. Cl.
*G06T 5/00* (2006.01)
*G09G 3/20* (2006.01)
*G09G 3/3208* (2016.01)
*G09G 3/36* (2006.01)

(52) U.S. Cl.
CPC ........... *G06T 5/003* (2013.01); *G09G 3/2051* (2013.01); *G09G 3/3208* (2013.01); *G09G 3/3611* (2013.01); *G09G 2300/0452* (2013.01); *G09G 2320/0233* (2013.01)

(58) Field of Classification Search
CPC combination set(s) only.
See application file for complete search history.

(56) References Cited

U.S. PATENT DOCUMENTS

| | | | |
|---|---|---|---|
| 6,415,053 B1 * | 7/2002 | Norimatsu | G06T 5/20 348/625 |
| 2008/0204393 A1 * | 8/2008 | Ben-David | G09G 3/007 345/98 |
| 2014/0292820 A1 * | 10/2014 | Park | G09G 3/3208 345/690 |
| 2016/0155416 A1 * | 6/2016 | Lee | G09G 3/2003 345/690 |

* cited by examiner

*Primary Examiner* — Temesghen Ghebretinsae
*Assistant Examiner* — Sosina Abebe
(74) *Attorney, Agent, or Firm* — Yunling Ren

(57) ABSTRACT

The present disclosure relates to a method and device for processing image data and a display device including the device for processing image data. The device for processing image data includes: an edge detector for receiving image data to be displayed, and performing edge detection on the image data to identify edge subpixel points; a brightness comparator for comparing brightnesses of the identified edge subpixel points with a preset brightness; a brightness attenuator for attenuating brightnesses of edge subpixel points which have a brightness greater than the preset brightness to obtain image data to be transmitted; and a data transmitter for transmitting the image data to a source driver. The present disclosure can effectively eliminate zigzag edges, and meanwhile guarantee the sharpness at edges of an image.

10 Claims, 10 Drawing Sheets

| -1 | 0 | 1 |
|----|---|---|
| -2 | 0 | 2 |
| -1 | 0 | 1 |

Fig. 6A

| 1 | 2 | 1 |
|---|---|---|
| 0 | 0 | 0 |
| -1 | -2 | -1 |

DISPLAY DEVICE, METHOD AND DEVICE FOR PROCESSING IMAGE DATA

CROSS-REFERENCE TO RELATED APPLICATIONS

This application claims priority to Chinese Patent Application No. 201510506973.7, filed Aug. 18, 2015, the entire contents of which are incorporated herein by reference.

TECHNICAL FIELD

The present disclosure generally relates to display technologies, and more particularly, to a device and a method for processing image data, and a display device including the device for processing image data.

BACKGROUND

With development of optical and semiconductor technologies, display panels such as Liquid Crystal Displays (LCDs) and Organic Light Emitting Diodes (OLEDs) are widely applied in various electronic products. Generally, LCD and OLED panels may have a strip subpixel arrangement, a delta subpixel arrangement or other type of arrangement.

Figure 1:
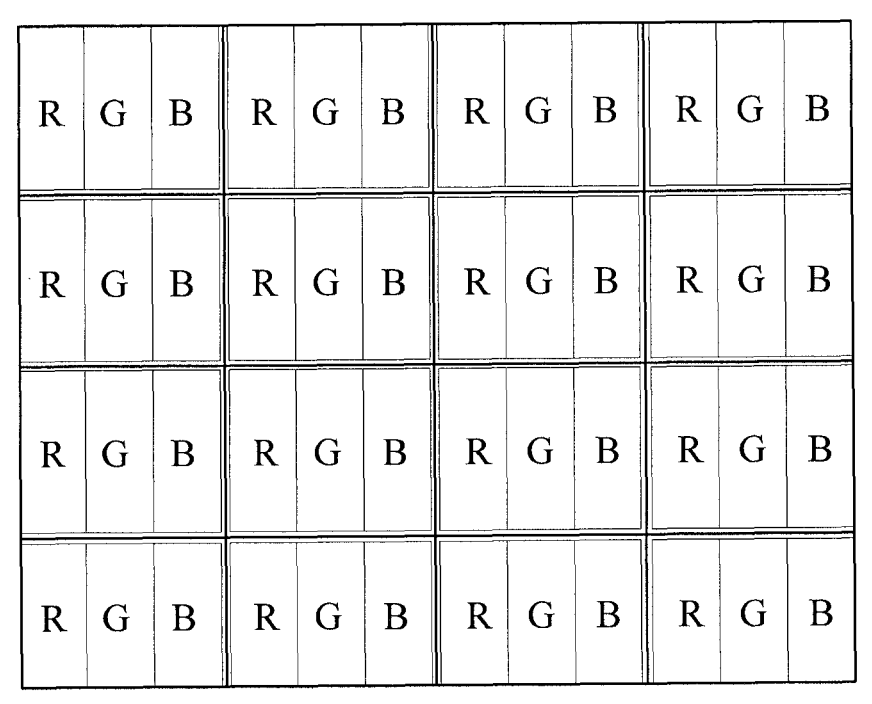

FIG. 1 is a schematic diagram showing a display panel having a strip subpixel arrangement. In the display panel with a strip arrangement, each pixel unit includes a red (R) subpixel, a green (G) subpixel, and a blue (B) subpixel which are arranged in the same row. The three-color subpixels of each pixel unit generate different brightnesses, respectively, for being mixed into various colors.

FIG. 2 is a schematic diagram showing a display panel having a delta subpixel arrangement. In the display panel with a delta arrangement, each pixel unit includes two subpixels of different colors in the same row (for example, a red (R) subpixel and a green (G) subpixel) and a subpixel in the neighboring row and of a third color (for example, a blue (B) subpixel). The subpixels of three colors in each pixel unit are arranged as a delta. The three-color subpixels arranged as a delta in each pixel unit generate different brightnesses, respectively, for being mixed into various colors.

However, as shown in FIG. 3 in which numbers represent brightnesses, in images displayed on a display panel having the delta arrangement, zigzags may occur at edges of objects, thereby resulting in unsmooth display at edges of objects. As a result, the display effect is compromised. Aiming at such defect, referring to FIG. 4 in which numbers represent brightnesses, one technology is to use a Low Pass Filter (LPF) to adjust brightnesses in a whole image or in large scale so as to eliminate the zigzag edges. However, although such technology can remove zigzag edges, it also causes blurring at edges in the image where no zigzag occurs, thereby resulting in deterioration in image quality.

SUMMARY

Embodiments of the present disclosure provide a method and a device for processing image data and a display device including the device for processing image data so as to, at least to some extent, overcome one or more problems resulted from limitations and defects in related arts.

Other properties and advantages of the present disclosure will become apparent from the following detailed description, or may be implemented by practice of the present disclosure.

According to a first aspect of the present disclosure, there is provided a device for processing image data transmitted from an image data generator to a source driver in a display device, comprising:

an image processor; and
a memory configured to store instructions executable by the image processor;
wherein the image processor is configured to:
receive the image data to be displayed from the image data generator, and perform edge detection on the image data to identify edge subpixel points;
compare brightnesses of the identified edge subpixel points with a preset brightness;
attenuate brightnesses of edge subpixel points which have a brightness greater than the preset brightness to obtain image data to be transmitted; and
transmit the image data to the source driver.

In an exemplary embodiment of the present disclosure, the image processor is further configured to:
receive original image data for a strip arrangement from the image data generator and convert the data into the image data to be displayed for a delta arrangement.

In an exemplary embodiment of the present disclosure, the image processor is configured to perform the edge detection on the image data to be displayed using a Sobel edge detection algorithm or a RobertsCross edge detection algorithm.

In an exemplary embodiment of the present disclosure, the subpixel points include red, green and blue subpixel points, a preset brightness associated with the green subpixel points is greater than a preset brightness associated with the blue subpixel points, and the preset brightness associated with the blue subpixel points is greater than a preset brightness associated with the red subpixel points.

In an exemplary embodiment of the present disclosure, the image processor is configured to attenuate the brightnesses of the edge subpixel points which have a brightness greater than the preset brightness according to one or more preset attenuation coefficients.

In an exemplary embodiment of the present disclosure, the subpixel points include red, green and blue subpixel points, a preset attenuation coefficient associated with the green subpixel points is greater than a preset attenuation coefficient associated with the blue subpixel points, and the preset attenuation coefficient associated with the blue subpixel points is greater than a preset attenuation coefficient associated with the red subpixel points.

In an exemplary embodiment of the present disclosure, the image processor is configured to attenuate the brightnesses using a low pass filter.

According to a second aspect of the present disclosure, there is provided a method for processing image data transmitted from an image a data generator to a source driver in a display device, including:

receiving image data to be displayed from the image data generator, and performing edge detection on the image data to identify edge subpixel points;
comparing brightnesses of the identified edge subpixel points with a preset brightness;
attenuating brightnesses of edge subpixel points which have a brightness greater than the preset brightness to obtain image data to be transmitted; and
transmitting the image data to the source driver.

In an exemplary embodiment of the present disclosure, the method for processing image data may further include:

receiving original image data for a strip arrangement from the image data generator and converting the data into the image data to be displayed for a delta arrangement.

In an exemplary embodiment of the present disclosure, the edge detection includes:

performing the edge detection on the image data to be displayed using a Sobel edge detection algorithm or a RobertsCross edge detection algorithm.

In an exemplary embodiment of the present disclosure, the subpixel points include red, green and blue subpixel points, a preset brightness associated with the green subpixel points is greater than a preset brightness associated with the blue subpixel points, and the preset brightness associated with the blue subpixel points is greater than a preset brightness associated with the red subpixel points.

In an exemplary embodiment of the present disclosure, the attenuating the brightnesses includes:

attenuating the brightnesses of the edge subpixel points which have a brightness greater than the preset brightness according to one or more preset attenuation coefficients.

In an exemplary embodiment of the present disclosure, the subpixel points include red, green and blue subpixel points, a preset attenuation coefficient associated with the green subpixel points is greater than a preset attenuation coefficient associated with the blue subpixel points, and the preset attenuation coefficient associated with the blue subpixel points is greater than a preset attenuation coefficient associated with the red subpixel points.

In an exemplary embodiment of the present disclosure, the attenuating the brightnesses includes:

attenuating the brightnesses using a low pass filter.

According to a third aspect of the present disclosure, there is provided a display device including the device for processing image data as mentioned above.

In the exemplary embodiments of the present disclosure, edge subpixel points are identified from image data for a delta arrangement, and brightnesses of edge subpixel points which have a brightness greater than a preset brightness are adjusted. Thus, the extent for brightness adjusting can be reasonably controlled. As compared with conventional technologies in which brightnesses in a whole image are adjusted or brightnesses are adjusted in a large scale, the present disclosure can effectively eliminate zigzag edges, and meanwhile avoid blurring at edges where no zigzag occurs. Consequently, the present disclosure can guarantee sharpness at edges of an image and thereby improve display quality.

BRIEF DESCRIPTION OF THE DRAWINGS

The above and other features and advantages of the present disclosure will become clearer from the description of exemplary embodiments with reference to drawings.

FIG. 1 is a schematic diagram showing a display panel having a strip subpixel arrangement in conventional technologies;

Figure 4:
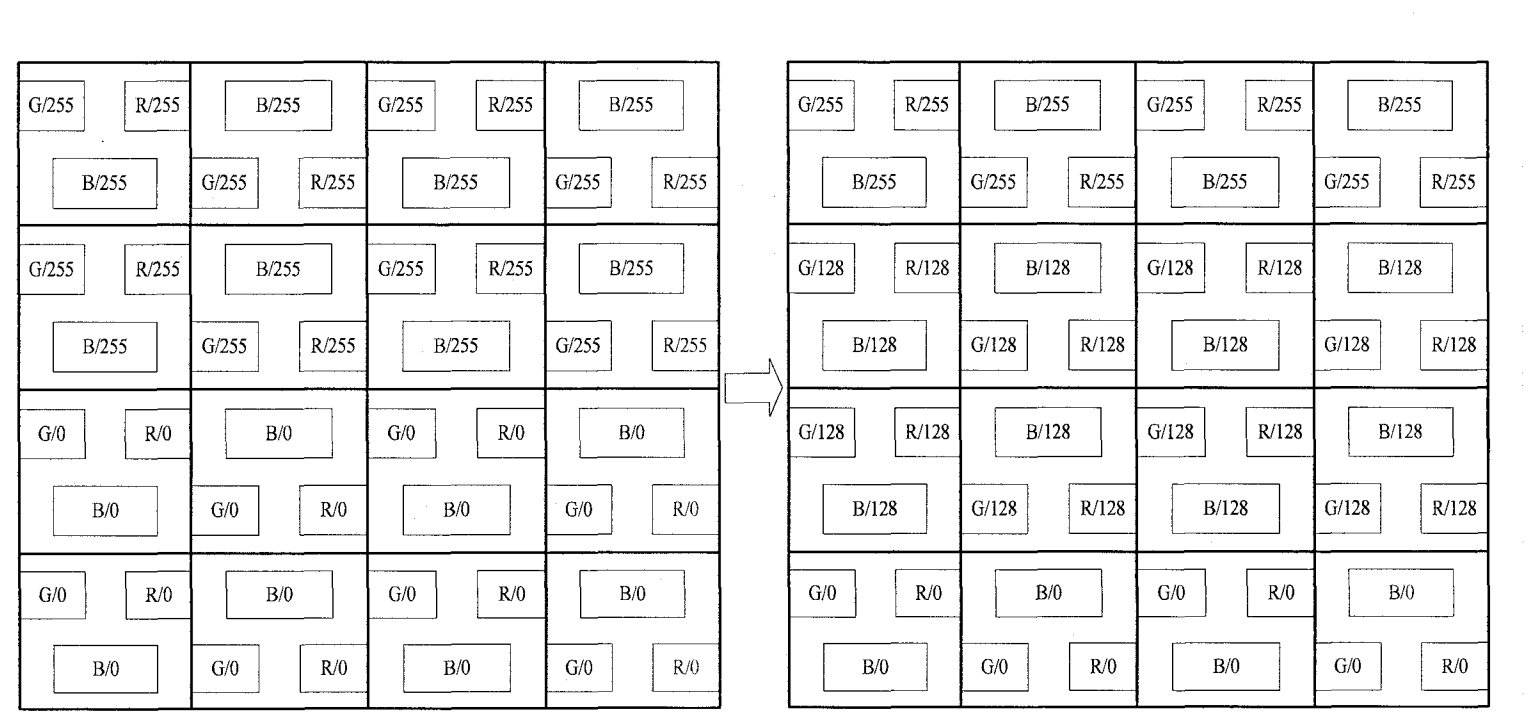

FIG. 4 is a schematic diagram showing effects achieved by using a solution for processing image data in conventional technologies;

FIGS. 6A and 6B are schematic diagrams showing a Sobel template according to an exemplary embodiment of the present disclosure;

FIG. 7 is a flowchart showing a method for processing image data according to an exemplary embodiment of the present disclosure.

REFERENCE NUMBERS

Figure 2:
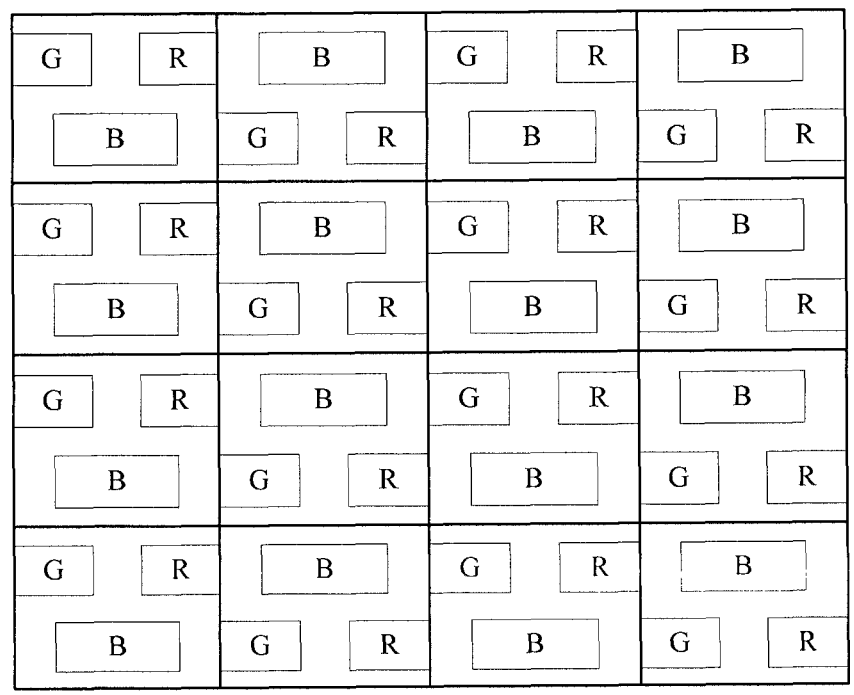
FIG. 2 is a schematic diagram showing a display panel having a delta subpixel arrangement in conventional technologies.
Figure 3:
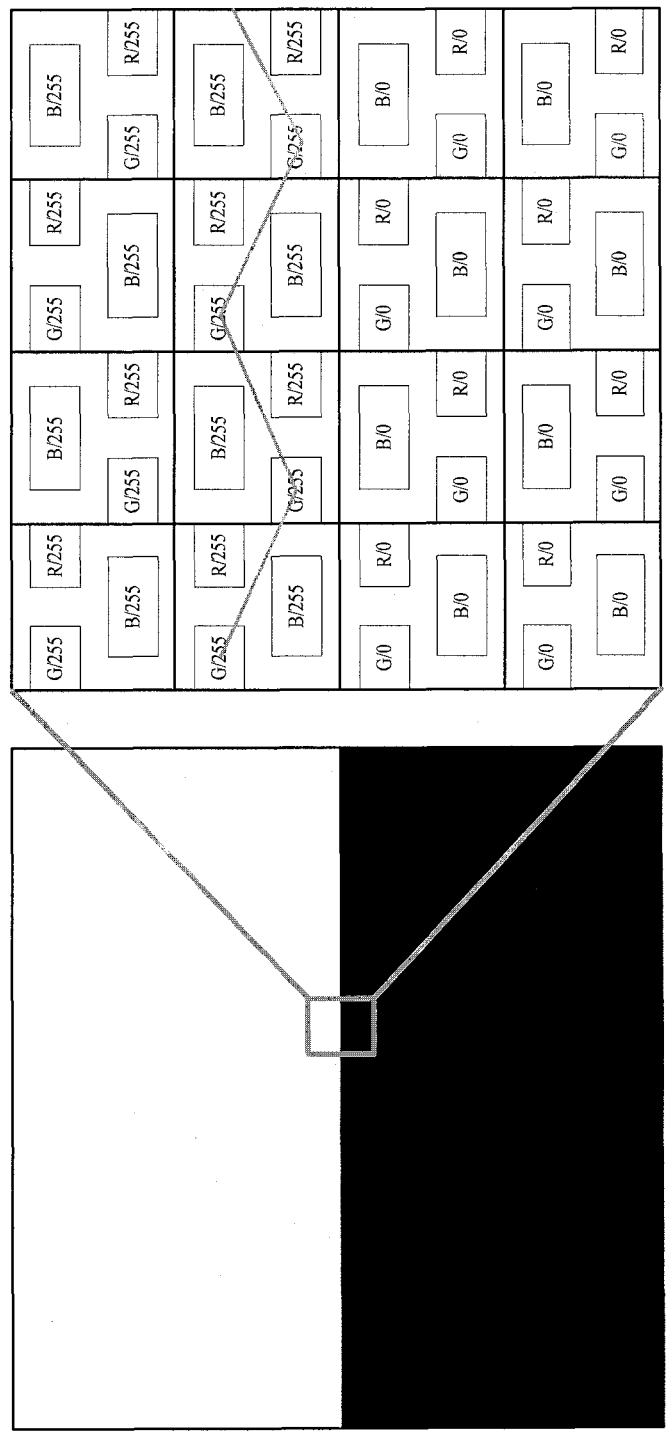
FIG. 3 is a schematic diagram showing zigzags appearing in an image displayed on the display panel as shown in FIG. 2.

10 device for processing image data
11 convertor
12 edge detector
13 brightness comparator
14 brightness attenuator
15 data transmitter
20 source driver
S0-S4 steps

DETAILED DESCRIPTION

Now, exemplary implementations will be described more comprehensively with reference to the accompanying drawings. However, the exemplary implementations may be carried out in various manners, and shall not be interpreted as being limited to the implementations set forth herein; instead, providing these implementations will make the present disclosure more comprehensive and complete and will fully convey the conception of the exemplary implementations to the ordinary skills in this art. In the drawings, for sake of clarity, thicknesses of regions and layers are exaggerated. Throughout the drawings, the like reference numbers refer to the same or the like structures, and repeated descriptions will be omitted.

The features, structures or characteristics described herein may be combined in one or more embodiments in any suitable manner. In the following descriptions, many specific details are provided to facilitate sufficient understanding of the embodiments of the present disclosure. However, one of ordinary skills in this art will appreciate that the technical solutions in the present disclosure may be practiced without one or more of the specific details, or by employing other methods, structures, steps and so on. In other conditions, well-known methods, structures or steps are not shown or described in detail so as to avoid confusion of respective aspects of the present disclosure.

Figure 9:
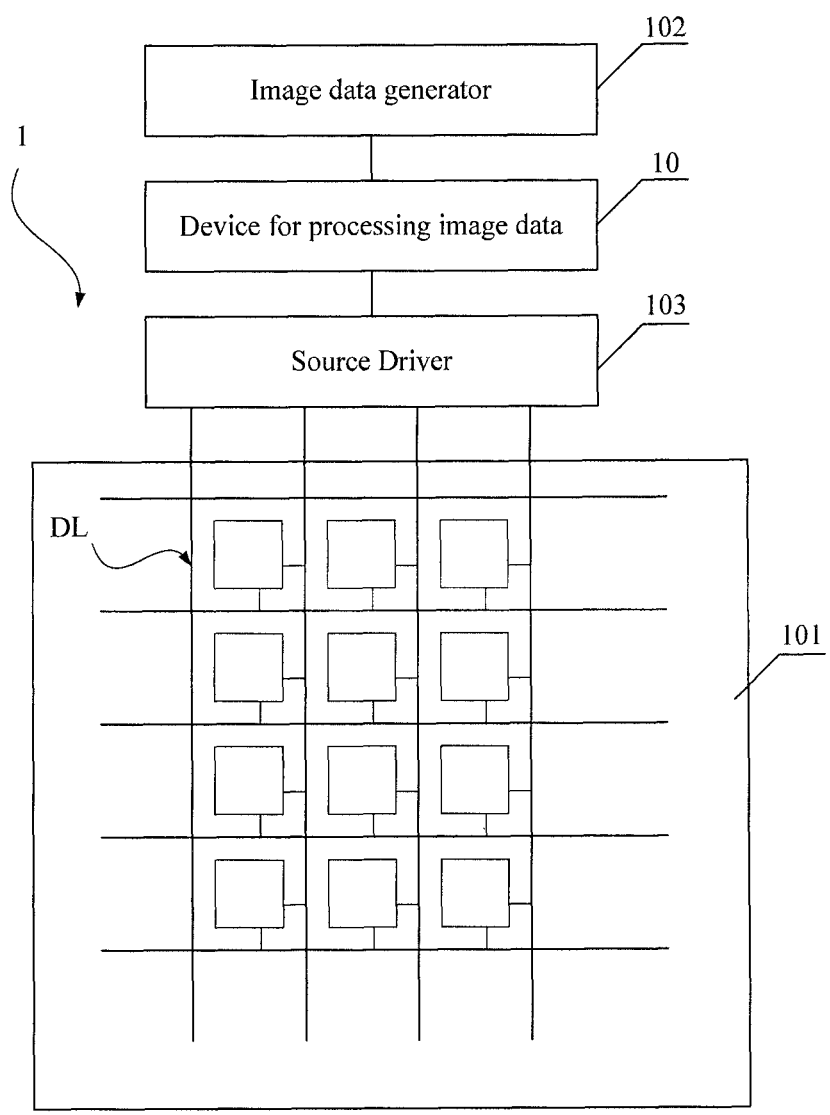
FIG. 9 is an implementation environment of devices and methods of the present disclosure.

FIG. 9 illustrates an implementation environment for devices and methods of the present disclosure. A display device 1 generally includes a display panel 101 which may be an OLED or LCD panel, for example. The display panel 101 includes a plurality of pixels, each of which may include subpixels of different colors that are arranged in a strip arrangement or a delta arrangement. The display device 1 further includes an image data generator 102 and a source driver 103. The image data generator 102 generates original image data to be displayed on the display panel 1. The source driver 103 converts the image data into data signals suitable for being transmitted to the subpixels and transmits the data signals to the subpixels via data lines DL.

The display device 1 further includes a device 10 for processing image data the image data generated by the image data generator. By processing the image data, the device 10 can address the zigzag problems. 11

Figure 5:
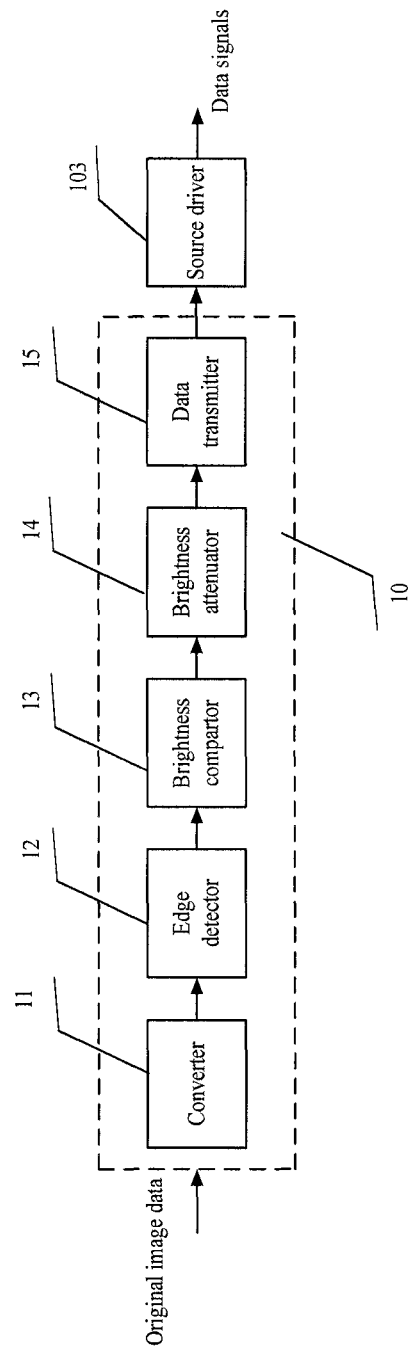
FIG. 5 is a block diagram showing a device for processing image data according to an exemplary embodiment of the present disclosure.

FIG. 5 is a block diagram showing the device 10 for processing image data. As shown in FIG. 5, the device 10 includes an edge detector (i.e., an edge detection module) 12, a brightness comparator (i.e., a brightness comparison module) 13, a brightness attenuator (i.e., a brashness attenuation module) 14 and a data transmitter (i.e., a data transmission module) 15. Also, the device 10 may include a converter 11.

The converter 11 receives original image data for a strip arrangement and converts the data into the image data to be displayed for a delta arrangement. For example, the converter 11 may convert the image data by mapping.

Most original image data are designed for the strip arrangement, and the image data cannot be directly applied in a display panel having a delta arrangement. Thus, the exemplary embodiment provides a converter 11 to convert the received original image data for the strip arrangement into image data to be displayed for the delta arrangement. The original image data for the strip arrangement may be RGB image data or RGBW image data and the like, and the embodiments of the present disclosure do not impose specific limitation on this. Each pixel unit in the display panel having the delta arrangement includes a red subpixel point, a green subpixel point and a blue subpixel point, and thus the image data to be displayed may be RGB image data. And, one of ordinary skills in this art may acquire other types of image data to be displayed depending on actual requirements. In addition, one of ordinary skills in this art shall appreciate that if the original image data is the data for the delta arrangement, the converter 11 can be omitted.

The edge detector 12 is connected with the converter 11, receives the image data to be displayed (for example, the data for the delta arrangement), and performs edge detection on the image data to identify edge subpixel points.

Figure 6A:
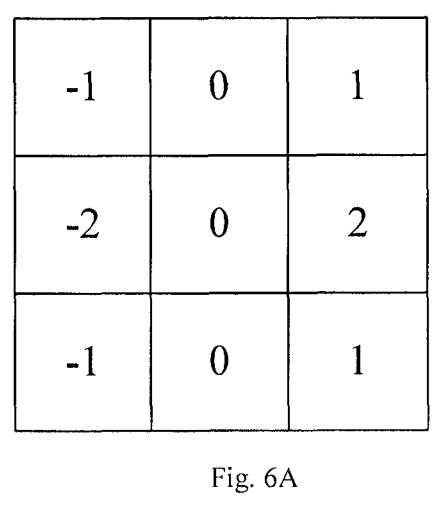
Figure 6B:
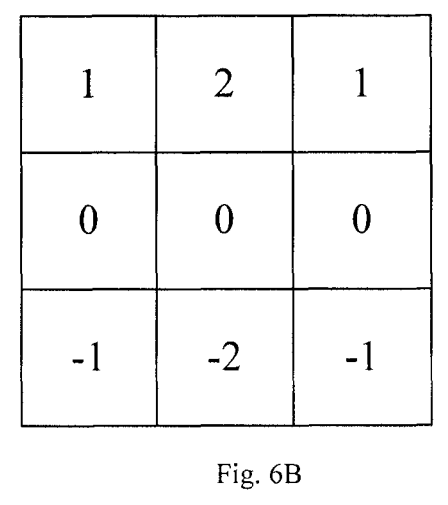

In the embodiment, the edge detector 12 may perform edge detection on the image data to be displayed using a Sobel edge detection algorithm. The Sobel template is as shown in FIGS. 6A to 6B. The numbers in FIGS. 6A and 6B represent weighting coefficients associated with respective subpixel points in a 3×3 region. FIG. 6A shows a template in a vertical direction, and FIG. 6B shows a template in a horizontal direction.

For the template in the vertical direction:

$$g1(x,y)=|[f(x-1,y+1)+2f(x,y+1)+f(x+1,y+1)]-[f(x-1,y-1)+2f(x+1,y)+f(x+1,y+1)]|$$

For the template in the horizontal direction:

$$g2(x,y)=|[f(x-1,y+1)+2f(x,y+1)+f(x+1,y+1)]-[f(x-1,y-1)+2f(x,y-1)+f(x+1,y-1)]|$$

where (x, y) represents coordinates of a center subpixel point, f(x, y) represents a brightness of a subpixel point corresponding to the coordinates (x, y), g1(x, y) or g2(x, y) represents a weighting value associated with the center subpixel point. If g1(x, y)>T, it can be deemed that the current center subpixel point is a subpixel at a vertical edge of an object displayed on the display panel. If g2(x, y)>T, it can be deemed that the current center subpixel point is a subpixel at a horizontal edge of an object displayed on the display panel. In the case where the directions of the edges are not considered, if s(x,y)=g1(x, y)+g2(x, y)>T, it can be deemed that the current center subpixel point is an edge subpixel point, where T is a threshold set according to actual situations.

The weighting coefficients in the Sobel template as mentioned above may be set by one of ordinary skills in this art according to specific requirements. In addition, the edge detector 12 may perform the edge detection on the image data to be displayed using a RobertsCross edge detection algorithm, a line edge detection algorithm or other types of algorithms, without being limited to the algorithms as illustrated herein.

The brightness comparator 13 is connected with the edge detector 12, and compares brightnesses of the edge subpixel points identified by the edge detector 12 with a preset brightness.

In the exemplary embodiment, the preset brightness may be a single brightness, or a plurality of preset brightnesses may be provided, depending on actual requirements. For example, according to the physiologic structure of the human eye, cone cells and rod cells in the retina of the eye are sensitive to different colors, and the density of the cone cells is lower than that of the rod cells. Particularly, the density of the cone cells sensitive to blue light of short wavelength is the lowest, and then is the density of the red-sensitive cone cells. In addition, due to the brightness effect of the blue-sensitive and red-sensitive cones (i.e., the stimulation to the brightness-sensitive rod cells) is far smaller than that of the green-sensitive cones, the brightness sensitivities of the human eye to green subpixel points, blue subpixel points and red subpixel points are decreased in order. In view of the above, in the exemplary embodiment, different preset brightnesses may be set for edge subpixel points of three different colors, respectively. For example, the preset brightness corresponding to the green edge subpixel points may be greater than the preset brightness corresponding to the blue edge subpixel points, and the preset brightness corresponding to the blue edge subpixel points may be greater than the preset brightness corresponding to the red edge subpixel points. In other exemplary embodiments of the present disclosure, a preset brightness may be set only for the green edge subpixel points, and the edge subpixel points of other colors can be untreated.

The brightness attenuator 14 is connected with the brightness comparator 13, and attenuates brightnesses of edge subpixel points which have a brightness greater than the preset brightness according to the comparison result obtained by the comparator 13 to obtain image data to be transmitted.

Figure 7:
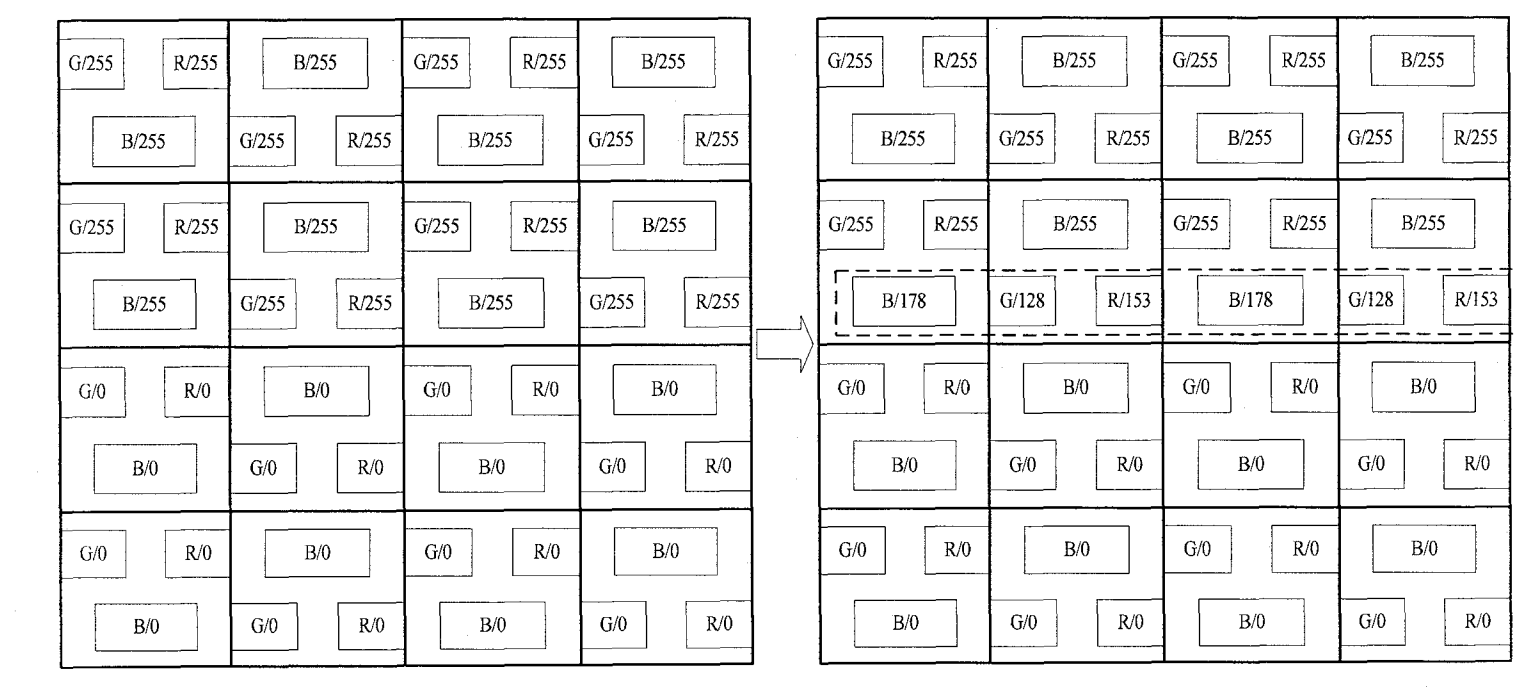

In the exemplary embodiment, the brightness attenuator 14 can attenuate the brightnesses of respective edge subpixel points according to one or more preset attenuation values. For example, the brightness attenuator 14 may reduce the brightnesses of the green, blue and red edge subpixel points which have an overhigh brightness by the same brightness value. Or, depending on the colors, the brightness attenuator 14 may reduce the brightnesses of the green, blue and red edge subpixel points by varied brightness values. Or, the brightness attenuator 14 can reduce the brightnesses of the edge subpixel points according to preset attenuation coefficients so that the original brightnesses of the edge subpixel points having an overhigh brightness can be attenuated differently and thereby to be displayed differently. Further, considering the sensitivities of the human eye to the brightnesses of the green, blue and red subpixel points, the preset attenuation coefficient corresponding to the green subpixel points can be greater than the preset attenuation coefficient corresponding to the blue subpixel points, and the preset attenuation coefficient corresponding to the blue subpixel points can be greater than the preset attenuation coefficient corresponding to the red subpixel points. The image data to be transmitted may be as shown in FIG. 7 in which numbers represent brightness values. As shown in FIG. 7, in the image data after processed by the device, the brightnesses of the edge subpixels as circled by the dotline are reduced, and thus the zigzag edges can be avoided. In other exemplary embodiments of the present disclosure, an attenuation coefficient may be set only for the green edge subpixel points, and edge subpixel points of other different colors can be untreated.

In the exemplary embodiment, the brightness attenuator 14 can attenuate the brightnesses of the edge subpixel points by a low pass filter. In a display device provided with a light filter, the brightness attenuator 14 can attenuate the brightnesses of the edge subpixel points by controlling the transmittance of the light filter, and the present disclosure is not limited to this.

The data transmitter 15 is connected with the brightness attenuator 14, receives the image data from the brightness attenuator 14, and transmits the image data to a source driver 20. After converting the image data into data signals, the source driver 20 transmits the data signals to respective columns of subpixels which arranged as a delta arrangement in the display panel via datalines so as to realize display.

It is noted that the various modules, sub-modules, units, or components (such as the edge detector, the brightness comparator, the brightness attenuator, and the data transmitter) described in the present disclosure can be implemented using any suitable technology. In an example, the edge detector, the brightness comparator, the brightness attenuator, and the data transmitter can be implemented using circuitry such as an integrated circuit (IC). In an example, the edge detector, the brightness comparator, the brightness attenuator, and the data transmitter can be implemented as processing circuitry executing software instructions. Specifically, the device for processing image data can be implemented as a device including a memory and an image processor. The memory can store instructions which can be executed by the image processor to perform the steps for processing image data.

Figure 8:
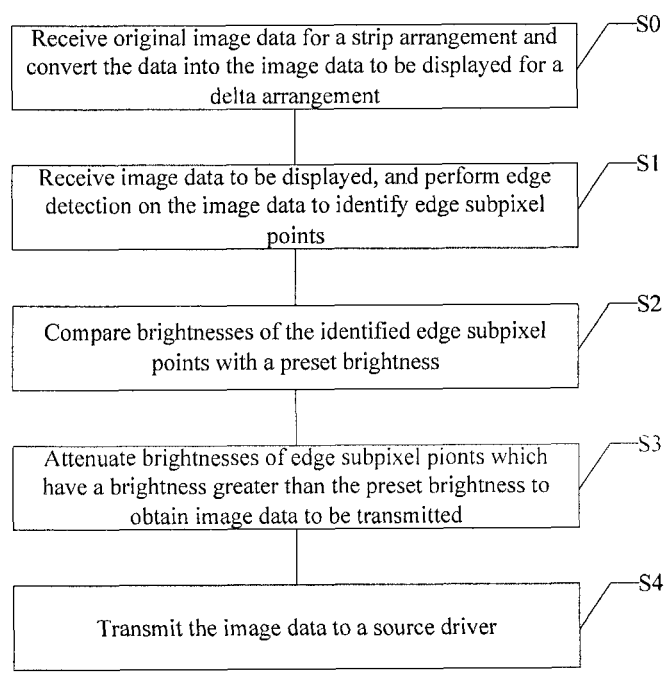
FIG. 8 is a schematic diagram showing effects achieved by using the solution for processing image data according to an exemplary embodiment of the present disclosure.

Embodiments of the present disclosure further provide a method for processing image data. As shown in FIG. 8, the method includes the following steps.

In step S1, the device for processing image data receives image data to be displayed, and performs edge detection on the image data to identify edge subpixel points.

In step S2, the device compares brightnesses of the edge subpixel points identified in the step S1 with a preset brightness.

In step S3, the device attenuates brightnesses of edge subpixel points which have a brightness greater than the preset brightness according to the comparison result in step S2 to obtain image data to be transmitted.

In step S4, the device transmits the image data to a source driver.

According to an exemplary embodiment, the method for processing image data may further include step S0, in which the device receives original image data for a strip arrangement and converting the data into the image data to be displayed for a delta arrangement.

The above detailed descriptions regarding the device for processing image data also apply to the method for processing image data, and repeated descriptions are omitted herein.

In the embodiments of the present disclosure, edge subpixel points are identified from image data for a delta arrangement, and brightnesses of edge subpixel points which have a brightness greater than a preset brightness are adjusted. Thus, the extent for brightness adjusting can be reasonably controlled. As compared with conventional technologies in which brightnesses in a whole image are adjusted or brightnesses are adjusted in a large scale, the present disclosure can effectively eliminate zigzag edges, and meanwhile avoid blurring at edges where no zigzag occurs. Consequently, the device and method for processing image data provided in the present disclosure can guarantee sharpness at edges of an image and thereby improve display quality.

Further, embodiments of the present disclosure further provide a display device which includes the above-mentioned device for processing image data. Specifically, the display device may include an OLED or LCD panel having a delta subpixel arrangement. The display panel may be connected with a source driver which receives the image data output from the device for processing image data. The device for processing image data can effectively eliminate zigzag edges, and meanwhile guarantee the sharpness at edges of an image, and thus the display device which includes such device for processing image data can offer improved display quality.

The above detailed descriptions relate to some possible implementations of the present disclosure, and however they are not for limiting the protection scope of the present disclosure, and any equivalent implementations or modifications without departing the spirit of the present disclosure shall fall within the protection scope of the present disclosure.

What is claimed is:

1. A device for processing image data transmitted from an image data generator to a source driver in a display device, comprising:
   an image processor; and
   a memory configured to store instructions executable by the image processor;
   wherein the image processor is configured to:
   receive the image data to be displayed from the image data generator, and perform edge detection on the image data to identify edge subpixel points;
   compare brightnesses of the identified edge subpixel points with a preset brightness;
   attenuate brightnesses of edge subpixel points which have a brightness greater than the preset brightness to obtain image data to be transmitted; and
   transmit the image data to the source driver;
   wherein the image processor is configured to attenuate the brightnesses of the edge subpixel points which have a brightness greater than the preset brightness according to one or more preset attenuation coefficients;
   wherein the subpixel points comprise red, green and blue subpixel points, a preset attenuation coefficient associated with the green subpixel points is greater than a preset attenuation coefficient associated with the blue subpixel points, and the preset attenuation coefficient associated with the blue subpixel points is greater than a preset attenuation coefficient associated with the red subpixel points.

2. The device according to claim 1, wherein the image processor is further configured to:
   receive original image data for a strip arrangement from the image data generator and convert the data into the image data to be displayed for a delta arrangement.

3. The device according to claim 1, wherein the image processor is configured to attenuate the brightnesses using a low pass filter.

4. A method for processing image data transmitted from a image data generator to a source driver in a display device, comprising:
 receiving image data to be displayed from the image data generator, and performing edge detection on the image data to identify edge subpixel points;
 comparing brightnesses of the identified edge subpixel points with a preset brightness;
 attenuating brightnesses of edge subpixel points which have a brightness greater than the preset brightness to obtain image data to be transmitted; and
 transmitting the image data to the source driver;
 wherein the attenuating the brightnesses comprises:
 attenuating the brightnesses of the edge subpixel points which have a brightness greater than the preset brightness according to one or more preset attenuation coefficients;
 wherein the subpixel points comprise red, green and blue subpixel points, a preset attenuation coefficient associated with the green subpixel points is greater than a preset attenuation coefficient associated with the blue subpixel points, and the preset attenuation coefficient associated with the blue subpixel points is greater than a preset attenuation coefficient associated with the red subpixel points.

5. The method according to claim 4, further comprising:
 receiving original image data for a strip arrangement from the image data generator and converting the data into the image data to be displayed for a delta arrangement.

6. The method according to claim 4, wherein the attenuating the brightnesses comprises:
 attenuating the brightnesses using a low pass filter.

7. A display device, comprising:
 a display panel;
 an image data generator configured to generate image data to be displayed on the display panel;
 a device configured to process the image data generated by the image data generator; and
 a source driver configured to receive the processed image data from the device and process the image data and transmit the image data to subpixels in the display device;
 wherein the device comprises:
 an image processor; and
 a memory for storing instructions executable by the image processor;
 wherein the image processor is configured to:
 receive the image data to be displayed from the image data generator, and perform edge detection on the image data to identify edge subpixel points;
 compare brightnesses of the identified edge subpixel points with a preset brightness;
 attenuate brightnesses of edge subpixel points which have a brightness greater than the preset brightness to obtain image data to be transmitted; and
 transmit the image data to the source driver;
 wherein the image processor is configured to attenuate the brightnesses of the edge subpixel points which have a brightness greater than the preset brightness according to one or more preset attenuation coefficients;
 wherein the subpixel points comprise red, green and blue subpixel points, a preset attenuation coefficient associated with the green subpixel points is greater than a preset attenuation coefficient associated with the blue subpixel points, and the preset attenuation coefficient associated with the blue subpixel points is greater than a preset attenuation coefficient associated with the red subpixel points.

8. The display device according to claim 7, wherein the image processor is further configured to:
 receive original image data for a strip arrangement from the image data generator and convert the data into the image data to be displayed for a delta arrangement.

9. The display device according to claim 7, wherein the image processor is configured to attenuate the brightnesses using a low pass filter.

10. The display device according to claim 8, wherein the image processor is configured to attenuate the brightnesses using a low pass filter.

* * * * *